(12) United States Patent
Hagan et al.

(10) Patent No.: US 9,163,440 B2
(45) Date of Patent: Oct. 20, 2015

(54) CONTROLLED LATCH CLAMP

(75) Inventors: Ken Hagan, Eastpointe, MI (US); David Martin, Dearborn, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 953 days.

(21) Appl. No.: 11/711,311

(22) Filed: Feb. 27, 2007

(65) Prior Publication Data
US 2007/0214615 A1    Sep. 20, 2007

Related U.S. Application Data

(60) Provisional application No. 60/778,795, filed on Mar. 3, 2006.

(51) Int. Cl.
| | | |
|---|---|---|
| *B65D 45/00* | (2006.01) | |
| *E05C 19/14* | (2006.01) | |
| *B25B 5/08* | (2006.01) | |
| *B25B 5/12* | (2006.01) | |
| *F16B 2/18* | (2006.01) | |
| *F16B 2/10* | (2006.01) | |

(52) U.S. Cl.
CPC . *E05C 19/14* (2013.01); *B25B 5/08* (2013.01); *B25B 5/12* (2013.01); *F16B 2/18* (2013.01); *E05C 19/145* (2013.01); *F16B 2/10* (2013.01); *Y10T 24/44333* (2015.01)

(58) Field of Classification Search
USPC ............... 292/256, 256.69, 256.75, 257, 258
See application file for complete search history.

(56) References Cited

U.S. PATENT DOCUMENTS

| | | | |
|---|---|---|---|
| 2,703,431 A * | 3/1955 | Tatom | 16/258 |
| 2,832,446 A | 4/1958 | Smith | |
| 4,407,493 A | 10/1983 | Okolischan | |
| 4,422,218 A | 12/1983 | Brasseux | |
| 4,493,133 A | 1/1985 | Nilsson | |
| 4,651,392 A | 3/1987 | Olivieri | |
| 4,828,299 A * | 5/1989 | Poe | 292/139 |
| 5,083,350 A | 1/1992 | Sandreid | |
| 5,098,139 A * | 3/1992 | Larsson | 292/97 |
| 5,165,148 A | 11/1992 | Fleischer et al. | |
| 5,586,367 A | 12/1996 | Benoit | |
| 6,374,465 B1 | 4/2002 | Dykstra | |
| 7,178,840 B1 * | 2/2007 | Veach | 292/256.5 |
| 7,252,311 B2 * | 8/2007 | Pratt et al. | 292/113 |

FOREIGN PATENT DOCUMENTS

| | | |
|---|---|---|
| DE | 30 45 865 | 7/1982 |
| DE | 90 16 416 | 4/1991 |
| FR | 590.033 | 6/1925 |

\* cited by examiner

*Primary Examiner* — Mark Williams
(74) *Attorney, Agent, or Firm* — Harness, Dickey & Pierce, P.L.C.

(57) ABSTRACT

A controlled latch clamp including a base and a handle pivotally connected to the base. The clamp has a link pivotally connected to the handle and to a plunger. The plunger also being pivotally connected to the base. The clamp includes an arm connected to an end of the plunger.

24 Claims, 2 Drawing Sheets

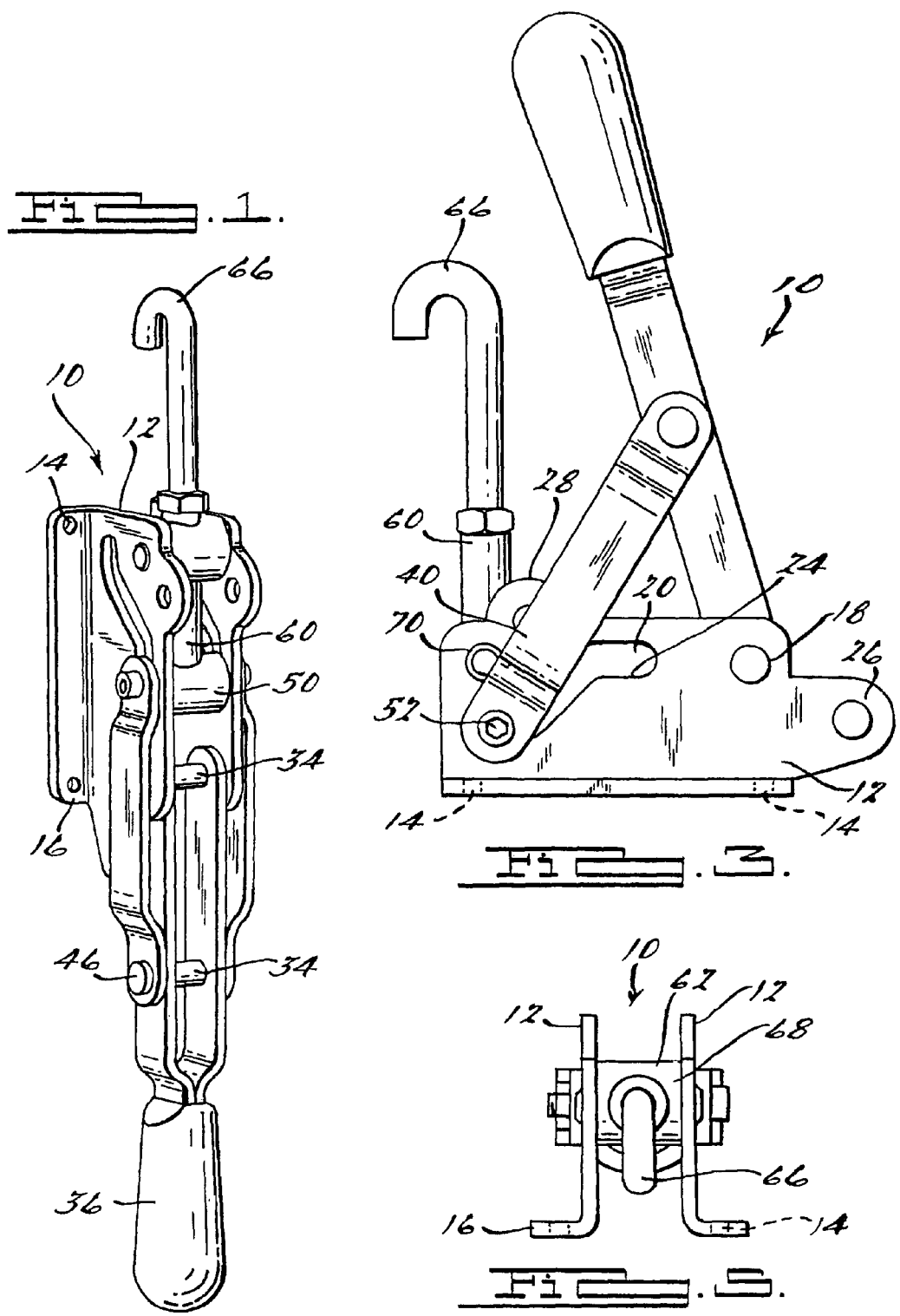

CONTROLLED LATCH CLAMP

Continuation of Provisional Application Ser. No. 60/778,795 Filed Mar. 3, 2006

BACKGROUND OF THE INVENTION

1. Field of the Invention

This invention broadly relates to a new pull action clamp mechanism. More particularly, the invention relates to a controlled latch clamp mechanism which has a special linkage system that provides unique advantages over the prior art.

2. Description of Related Art

Manual pull action clamps have been known for many years in the art. Some of these pull action clamps are over center toggle locking action clamps that are ideally suited for holding against heavy forces such as those generated in manufacturing environments. Many of these prior art pull action clamps are used with base bolted or welded in place applications wherein the units can be used for latching pressure vessels, clean out doors, lids, covers on a drum container or other vessel, and other industrial applications. These clamps are capable of being used in small spaces and may include bar members that are threaded to allow for convenient adjustment of the prior art pull action clamps.

Many of these prior art pull action clamps have a handle member fixed to an outside surface of a base member with the hook or lock arm typically rotatable about the handle member. These clamps provide a maximum holding capability with easy operation and simple adjustments necessary for use in the industrial applications.

However, there is a need in the art for an improved controlled pull latch clamp. There also is a need in the art for a controlled latch clamp that has a hook traveling along predetermined paths in predetermined directions with relation to the device being clamped. There also is a need in the art for a controlled latch clamp that allows 90° of hook movement between a clamp open position to a clamp closed position thus keeping the hook from interfering with the object being clamped.

There also is a need in the art for a new pull action clamp that is lower in cost and easier to manufacture. There also is a need in the art for an improved controlled pull action latch clamp that is capable of holding at higher holding forces while decreasing the chance of the clamp untoggling during use.

SUMMARY OF THE INVENTION

It may be an object of the present invention to provide a new clamp mechanism which has a much lower closed clamp profile relative to prior art clamping mechanisms.

Another object of the present invention may be to provide a clamping mechanism which when opening has its hook member traveling in a straight direction away from the base of the clamp and then pivoting 90° to its fully opened position.

Another object of the present invention may be to allow 90° of hook movement which will ensure the hook does not interfere with the object being clamped.

Still another object of the present invention may be to provide a new pull action clamp that has a slot and pin arrangement that will guide the hook during the opening and closing of the clamp.

Another object of the present invention may be to provide a clamp that is capable of being assembled with lower cost parts in the manufacturing process.

Still another object of the present invention may be to provide a clamp that is easier to assemble while also providing for higher holding forces in its fully clamped or toggled position.

Yet another object of the present invention may be to provide a new clamping mechanism that can operate as both a J-hook clamping mechanism and a U-hook clamping mechanism.

According to the present invention, the foregoing and other objects and advantages are obtained by a novel design for an improved controlled latch clamp for use in industrial applications. The controlled latch clamp includes a base member having a predetermined shaped slot arranged therein. The controlled latch clamp also includes a handle member pivotally connected to the base member at one end thereof. A hook member is arranged in the slot of the base member on one end thereof. A link member is pivotally connected to the handle member at a predetermined position on one end thereof and pivotally connected to an end of the hook member on the other end. The hook moves between a fully open and fully closed position including traveling in a 90° arc away from the base member and then in a linear direction towards the base member to get into its fully clamped position. The hook is also pivotally connected at a fixed point to the base member at a mid portion thereof. A bearing member is arranged between the base members and engages the hook. A grip is arranged over the end of the handle member.

Other objects, features and advantages of the present invention will become apparent from the subsequent description taken in conjunction with the accompanying drawings.

BRIEF DESCRIPTION OF THE DRAWINGS

FIG. 3 shows a side view of the clamp in its fully open position.

FIG. 4 shows a top view of the clamp in its fully closed or clamped position.

FIG. 5 shows an end view of the clamp according to the present invention.

DESCRIPTION OF THE EMBODIMENT(S)

Figure 2:
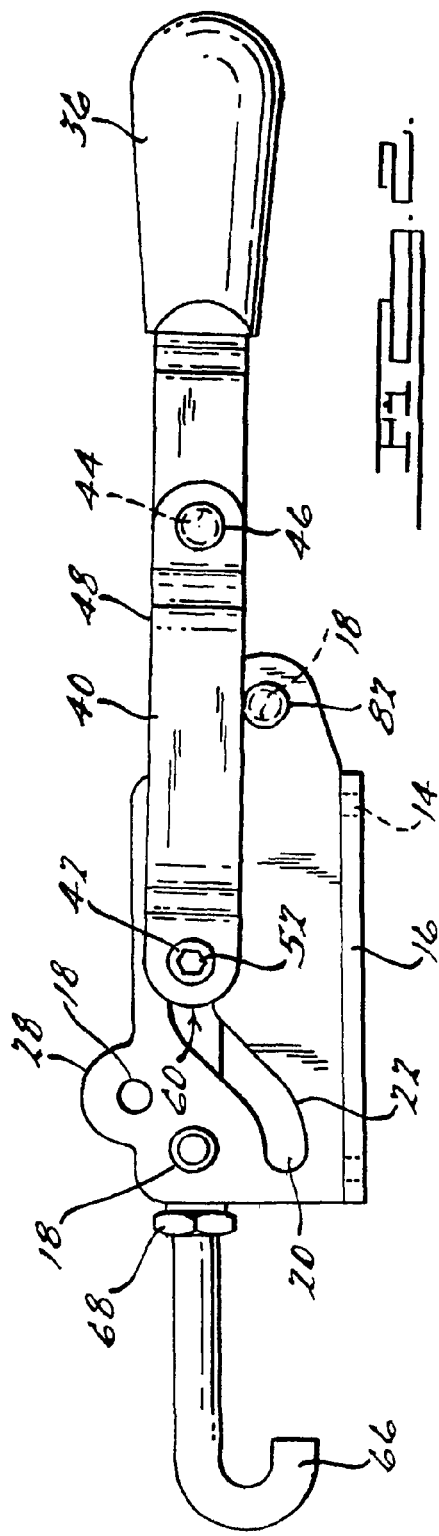
FIG. 2 shows a side view of the clamp according to the present invention.
Figure 1:
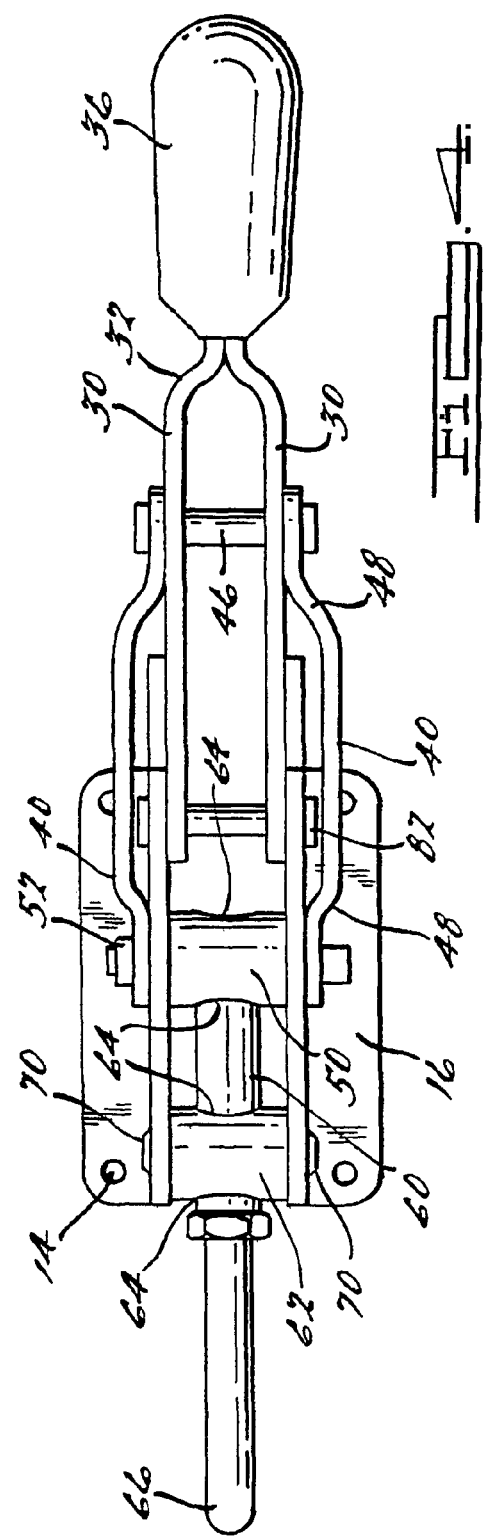
FIG. 1 shows a perspective view of the controlled latch clamp according to the present invention.

Referring to the drawings, FIGS. 1 through 5 show an embodiment of a controlled latch clamp 10 according to the present invention. The controlled latch clamp 10 generally is a pull action clamp that uses a toggle or over center position to put the clamp 10 in a closed or fully clamped position. However, it is contemplated to use a wedge lock design in the controlled latch clamp 10 according to the present invention. It should be noted that the clamp 10 shown is only one possible embodiment for the controlled latch clamp 10 according to the present invention. The clamp 10 may be configured with different size and shape components and may be configured in a different clamping environment such as but not limited to power clamps, electric clamps, manual clamps, pivot units, hydraulic clamps, electromechanical clamps or any other known clamps. The over center toggle locking action of the clamp 10 according to the present invention makes it ideally suited for holding against heavy forces such as those generated in many industrial operations such as plastic molding operations, clamping of doors, lids or access covers on drums, containers or other vessels. It should also be noted that the clamps 10 according to the present invention may be used as a base bolted unit or a welded in place unit and may also be used for latching pressure vessels, clean out doors, and other high pressure industrial applications. The clamp 10 according to the present invention operates on a toggle action locking mechanism, however any other locking mechanism such as wedge lock, electrical lock, or other mechanical locking means may be used on the clamp 10 other than that as described herein and shown in the drawings.

FIGS. 1 through 5 show a controlled latch clamp 10 according to the present invention. The latch clamp 10 includes a base 12. The base 12 includes a first and second base member 12 wherein each base member 12 generally has an L-shaped cross section, however any other shape may also be used. The base member 12 may have a plurality of orifices 14 through one surface thereof wherein these orifices 14 may be used to connect the base member 12 to a work piece, a vessel, an object, a surface, a robot, or any other known surface via any known fastener or fastening technique. These orifices 14 are generally through a bottom flange 16 of the base 12 to allow for connection of the clamp 10 to the surface. The upright portion of the base 12 includes a plurality of orifices 18 therethrough and also includes a slot 20 arranged through the upright surface of the base members 12. The slot 20 generally has a curved portion 22 which extends into a straight portion 24 with the straight portion being near a top end of the base member 12 upright portion. It should also be noted that any known shape can be used for the slot 20 including any random shape. The slot 20 as shown in the figures will allow for a pin or other fastener to slide therein and will guide the hook in its predetermined travel positions and directions. Generally, the orifices 18 are circular in shape through the base member 12, however any other shaped orifice may be used depending on the design requirements and the environment for the clamp 10. It should be noted that the base members 12 generally are made of a steel material, however any other metal, plastic, ceramic, composite, or the like may be used according to the present invention. The upright portion of the base member 12 will include a lobe 26 extending from a back end thereof and a circumferential like knob 28 extending from a top portion thereof. As shown in the drawings, the first and second base members 12 are arranged side by side with a predetermined distance therebetween. The separated distance between the first and second base members 12 will be predetermined depending on the strength of the clamp 10, the load of the clamp 10, and the size of the components used to create the controlled latch clamp 10 according to the present invention.

A handle 30 is pivotally connected to the base member 12. The handle 30 includes a first and second handle member that are in contact with each other at one end. The other end of the handle members 30 are arranged on an inside surface of the base members 12 and are pivotally connected at a fixed point via any known fastener 46, such as a rivet, screw, pole, dowel, pin, etc. The handles 30 generally have an offset or bend 32 at a predetermined position along the handle members 30. The offsets 32 allow the handle 30 to be pivotally attached to the base members 12 while still allowing the handle 30 to have an easy grip for the user of the clamp 10. The handle member 30 will include a plurality of orifices 34 therethrough with one of the orifices 34 being used to pivotally connect the handle members 30 to the base members 12 through one of the orifices 18 of the base members 12. The orifice used to connect the handle members 30 pivotally to the base members 12 generally is located near a top portion of the upright portion of the base member 12. Arranged on the end of the handle 30 extending away from the base members 12 of the clamp 10 is a grip 36 which is generally made of a plastic, rubber, or any other known material. The grip 36 is arranged over the ends of the two handle members 30. The orifice through which the handle 30 pivotally connects to the base members 12 is generally located near an end of the handle members 30. This end of the handle member 30 is connected to the base member 12 at a fixed pivot point. It should be noted that the handle members 30 generally are made of a steel, however any other metal, plastic, ceramic, composite, or the like may also be used for the handle 30.

A first and second link member 40 which generally have an oval shape, are pivotally connected to the handle members 30 through one of the orifices 34 of the handle members 30. It should be noted that any shape may be used for the link members 30. One of the orifices 34 of the handle members 30 is located near or at a mid point of the handle member 30. The first and second link members 40 generally have one orifice 42 located on one end thereof and a second orifice 44 located on a second end thereof. The orifice 44 is used to pivotally connect to the handle member 30 via any known fastener 46 such as a rivet, screw, pole, dowel, pin, or any other known fastener. The link members 40 generally have a first and second offset or bend 48 located therein. The bends 48 are generally located near the ends of the link members 40. The bends 48 will allow for the link members 40 to rotate freely around the outer surfaces of the handle members 30 and upright portion of the base members 12. One end of the link members 40 is pivotally connected to a first bearing member 50 via any known fastener 52 such as a rivet, screw, fastener, hex fastener, dowel, pin, pole, or any other known fastener. The fastener 52 will be arranged within the slot 20 of the base members 12 and will travel along the slot 20 of the base members 12 between the controlled latch clamps fully closed position and fully open position. The link members 40 will pivot around both the handle member 30 and the bearing member 50 while also having one end move along with the fastener 52 in the slot 20 of the base member 12. Therefore, the pivot points where the link members 40 are connected to the handle member 30 and bearing member 50 are both movable with relation to the base 12 of the controlled latch clamp 10. The fastener 52 will slide into the linear portion 24 of the slot 20 of the base member 12 when the clamp 10 is in its fully clamped or over center toggle position thus creating a toggle between the handle member 30, the link member 40 and a hook member 60. The link member 40 contacts an outer surface of the base member 12 and an outer surface of the handle member 30 one at each end, respectively.

A plunger 60 is pivotally connected to an orifice 18 of the base member 12 at a fixed point. The plunger 60 is also pivotally connected to one end of the link member 40 at an end of the plunger 60. The plunger or hook member 60 includes a first 50 and second 62 bearing member. The bearing members 50, 62 generally have a cylindrical shape with an orifice through a diameter thereof. The bearing members 50, 62 generally will have a predetermined size and shape with the length of the bearing members 50, 62 defining at least in part the size of the gap between the first and second base members 12. It should be noted that the bearing members 50, 62 may include a circumferential channel through a longitudinal center point thereof. However, it should also be noted that the bearing members 50, 62 may include a first and second extension extending from each side of the bearing member 50, 62 from the center point thereof. These extensions generally would have a circumferential shape and would conform to an orifice arranged through the base members 12. The plunger 60 also includes a hook 66 which generally has a hooked end connected to a straight body member. The straight body member generally has at least one diameter portion that is generally slightly smaller than that of the orifice through the diameter of the first and second bearing members 50, 62. The hook 66 is generally threaded on one end and is threaded into a cavity in the end of the plunger 60. However, any other known connecting methods can be used to connect the hook 66 to the plunger 60. A nut, bolt or other fastening device 68 may be arranged over the hook end of the hook 66 to create a lock for the hook 66 with relation to the device or work piece being clamped by the controlled latch clamp 10 and the plunger 60. This allows for hook 66 to be changed without changing the clamp 10 or plunger 60. It should be noted that it is also contemplated to have a one piece hook and plunger member.

The first bearing member 50 which is pivotally connected to one end of the link member 40 and an end of the plunger 60 is arranged in the slot 20 and between the base members 12 when the clamp 10 is in its closed or open position. The bearing member 50 will slide along the slot 20 in the base member 12 to one end of the slot 20 when the clamp 10 is in its fully opened position. The plunger 60 may include a shoulder on one end thereof wherein the shoulder will engage with a surface of the first bearing member 50 to ensure the hook member 60 does not come dislodged from the first bearing member 50. The plunger 60 also may include in another embodiment an orifice through a diameter thereof wherein the fastener 52, which connects the link member 40 to the base member 12 and the plunger 60, will align with the orifice through the longitudinal edge of the bearing member 50 thus allowing for the bearing 50 and plunger 60 to be pivotally connected with relation to the slot 20 of the base member 12 and the end of the link members 40. The fastener 52 will pass through the orifices of the link members 52, the slot 20 of the base members 12, the longitudinal orifice of the bearing member 50 and the orifice through the end of the plunger 60. This will connect all of those components together at one movable pivot point with relation to the base member 12. The plunger 60 is fixed with relation to the first bearing member 50. The plunger 60 may even be welded to the first bearing member 50.

The second bearing member 62 in the embodiment shown may include the first and second extensions 70 extending from a center point thereof such that the bearing member 62 will be capable of pivotal rotation with relation to the base member 12 and the plunger 60 will be capable of movement with relation to the bearing member 62. The plunger 60 will slide through the orifice of the second bearing member 62 while the second bearing member 62 will be fixed with relation to the base member 12 except in a rotatable direction or sense. Hence, the plunger 60 will slide through the second bearing member 62 when going from the fully clamped or closed position to the fully open or unclamped position. The hook member, link members and bearing members generally are made of a steel material, however any other metal, composite, plastic, ceramic, or the like may be used for these components.

In operation, the clamp 10 in its fully open position, as shown in FIG. 3, will have the handle member 30 in a nearly vertical position and the plunger 60 in a nearly vertical position with relation to the base member 12. The end of the hook member 60, first bearing 50, and one end of the link member 40 will be located at the bottom portion of the slot 20 in the base member 12. The bottom portion of the slot 20 will be that portion at the end of the curved portion 22 of the slot 20. With the clamp 10 in the open position this will allow for a 90° arc movement of the hook 66 thus keeping the hook 66 from interfering with the object being clamped or held by the controlled latch clamp 10. It should be noted that hook 66 may travel and be held in any position of an arc in the range of 0° to 360°. When the clamp 10 is to be put in its fully closed or clamped position, the operator of the clamp 10 will rotate the handle 30, in a horizontal direction toward the back end of the base member 12 of the clamp 10. The fastener 52 connecting the link member 40, the first bearing member 50 and the end of the hook member 60 will slide along the curved portion 22 of the base member 12 thus allowing the hook 66 to pivot in a 90° plane until the hook 66 is generally in a horizontal position with relation to the base member 12. Then the fastener 52 will enter the straight or linear portion 24 of the slot 20 and will travel a predetermined distance until the fastener 52 reaches the end of the slot 20 in which the clamp 10 is in its fully closed or toggle/over center position. This linear straight movement at the end of the slot 20 will allow for the end of the hook member 60 to move in a linear direction towards the base member 12 of the clamp 10 thus hooking, securing and/or clamping the object being secured. The hook 66 will travel in its linear or straight motion a predetermined distance. It can travel anywhere from an eighth of a inch all the way up to four inches depending on the design requirements and environment in which the controlled latch clamp 10 will be used. In one contemplated embodiment the hook 66 will travel approximately one half inch. The changing of the design or shape of the slot 20 will allow for various travel positions for the plunger 60 between the fully open and fully closed positions. The hook 66 of the clamp 10 will move in a first 90° arc or plane then in a linear or straight direction with relation to the base member 10 or vice versa depending on whether the clamp 10 is being opened or closed. This will help keep the hook 66 from interfering with the object being clamped while also allowing for easy ergonomical use of the clamp 10 by the operator of such clamp 10. When the clamp 10 is in its toggle position the clamp 10 will be closed and will secure the object without the risk of being untoggled due to vibrations or the like. One of the orifices in the base member 12 may have a fastener 82 of any type to be placed therethrough and will allow for the link member 40 to contact the fastener 82 when the clamp 10 is in its fully closed or over center position. It should be noted that this fastener 82 may not be used in some contemplated embodiments of the controlled latch clamp 10. This fastener 82 can be used for the clamp 10 to toggle upon itself thus allowing for the end of the hook 66 to be placed at a predetermined position with relation to the object being clamped. One of the other orifices on the base member 12 may be used to hold the second bearing member 62 therein thus allowing the plunger 60 to latch or close at another angle with relation to the base member 12 when it is in its fully clamped or closed position.

It should also be noted that the controlled latch clamp 10 for the present invention is also contemplated to have a locking lever that will lock the clamp 10 in both its open and closed positions. The clamp 10 as described herein provides a more reliable clamp thus increasing the strength and durability of the clamp 10. The clamp 10 is also capable of having increased holding forces and a more repeatable clamped or closed position.

The present invention has been described in an illustrative manner. It is to be understood that the terminology which has been used is intended to be in the nature of words of description rather than of limitation.

Many modifications and variations of the present invention are possible in light of the above teachings. Therefore, the present invention may be practiced otherwise than as specifically described.

What is claimed is:

1. A controlled latch clamp, said clamp comprising:
   a base including a slot;
   a handle pivotally connected to said base;
   a link pivotally connected to said handle;
   a plunger pivotally connected to said base by a first connecting mechanism and the plunger connected to said link by a second connecting mechanism, said first connecting mechanism defines an axis, the first connecting mechanism axis is located at a first position that is fixed with respect to the base, the first connecting mechanism is rotatably connected, about the axis, on the base, said second connecting mechanism is movably positioned on the base at a second position, the first position is spaced from the second position on the base such that the first and second positions do not occupy the same position; and
   an arm connected to an end of said plunger, the plunger, via the second connecting mechanism moving in the slot in the base, enables said arm, during movement of the handle, to travel axially, during opening of the clamp along an axis of said plunger a predetermined distance and enables the arm to travel in a predetermined length rotational arc.

2. The clamp of claim 1 wherein said arm having a hook on one end thereof.

3. The clamp of claim 1 wherein said arm moves or travels along said axis away from said base approximately within a range of 1/8" to 4".

4. The clamp of claim 3 wherein said arm moves or travels away from said base approximately one half inch.

5. The clamp of claim 3 wherein said arm travels in said arc approximately 90° degree.

6. The clamp of claim 5 wherein said handle and said plunger being in a substantially vertical position with respect to said base when the clamp is in an open position.

7. The clamp of claim 1 wherein said base is low profile to create a low closed clamp profile.

8. The clamp of claim 1 wherein said slot having a curved portion and a straight portion extending from one end of said curved portion.

9. The clamp of claim 8 wherein said straight portion is arranged near a top end of said base.

10. The clamp of claim 1 wherein said base having a lobe extending from an end thereof.

11. The clamp of claim 1 wherein said base having a knob extending from a top edge thereof.

12. The clamp of claim 1 wherein said handle having an offset or bend at a predetermined position therein.

13. The clamp of claim 1 wherein said link having at least one offset or bend therein.

14. The clamp of claim 1 wherein said connecting mechanism being a first and a second bearing member.

15. The clamp of claim 14 wherein said first bearing member is pivotally connected to said link.

16. The clamp of claim 14 wherein said second bearing member enables linear movement on said plunger with relation to said base and is rotatable with respect to said base.

17. The clamp of claim 1 wherein during closing of the clamp said arm rotates from a generally vertical position to a generally horizontal position and then linearly travels along said axis towards said base until the clamp is toggled.

18. A manual pull action controlled clamp, said clamp comprising:
    a low profile base;
    a handle having a bend therein, said handle pivotally connected on one end thereof to said base, said handle having an outer surface that engages an inner surface of said base;
    a link having at least one bend therein, said link pivotally connected on one end to said handle and engaged with an outer surface of said base on an opposite end of said link;
    a plunger having a first and second bearing member, said first bearing member pivotally connected to said link and the base, the second bearing member defining an axis, the second bearing member axis is located at a position that is fixed with respect to the base, said second bearing member is pivotally connected, about the axis on said base; and
    an arm extending from an end of said plunger, when said handle is moved, the plunger, via the first bearing member moving along the base, enables said arm to move in two degrees of motion so that the arm moves generally linearly along an axis of said plunger and the arm rotates in a predetermined arc with respect to the second bearing member axis on said base.

19. The clamp of claim 18 wherein said base includes a first and second member each having a generally L-shaped cross section.

20. The clamp of claim 18 wherein said base having a slot, said slot having a curved portion and a straight portion extending from one end of said curved portion.

21. The clamp of claim 18 wherein said handle includes a first and second member.

22. The clamp of claim 18 wherein said link includes a first and second member.

23. The clamp of claim 18 wherein said arm and said handle are substantially vertical or perpendicular with relation to a bottom flange of said base when the clamp is open.

24. The clamp of claim 23 wherein said arm and said handle are generally parallel to one another and horizontal with relation to said bottom flange of said base when the clamp is closed.

* * * * *